Patented Nov. 16, 1948

2,454,123

UNITED STATES PATENT OFFICE 2,454,123

ENAMEL COMPOSITION

Charles J. Bartholomew, Birmingham, Mich., assignor to Ford Motor Company, Dearborn, Mich., a corporation of Delaware No Drawing. Application July 22, 1944, Serial No. 546,213

7 Claims. (Cl. 260—33.6)

This application is a continuation-in-part of my copending application, Serial No. 397,077, filed June 7, 1941, now abandoned.

The object of this invention is to provide an improved enamel composition particularly suited for spray application and baking.

A further object of this invention is to provide an enamel composition which, when sprayed on the surface to be painted in a heavy coat and baked dry, will be free from the orange-peel effect invariably resulting when ordinary enamels are so treated.

There are many articles and surfaces which can only be commercially enameled by spraying, due to their size and shape, and it is the object of this invention to provide an enamel which, when sprayed and dried in the conventional manner, will produce a surface equivalent to the surface produced by flowing the enamel or dipping the article therein. When enamel is applied by flowing or dipping, a heavy coating of uniform thickness results; but when it is sprayed, the coating is often uneven. The sprayed surface is the result of myriad droplets of enamel which in coalescing tend to form a rough surface. When this surface is dried or baked, its unevenness is accentuated by the glossy finish. This is known in the trade as "orange peel."

Orange peel may be smoothed by rubbing, but this operation entails considerable labor cost; and, of course, reduces the protection offered by the enamel. It is the purpose of this invention to eliminate the orange peel during the painting process rather than mechanically removing it after the baking has been completed.

A further object of this invention is to provide an improved enamel which upon the application of only one coat will have maximum hiding power. This formerly required several coats if applied thin enough to prevent orange peel.

From the standpoint of appearance, enamel finishes must have fullness of surface and luster, both of which are dependent on the amount of deposited solids in the coat. That is, there must be a relatively high percentage of such solids in the film if the marks or defects in the primer coat are to be covered. However, when the enamel is sprayed on such a surface, if too thick a coat is applied, the coating sags to produce runs or ripples which must be prevented. In this art a "wet coat" is known as the thickest coat which may be sprayed without danger of sagging or rippling. With this improved enamel a "wet coat" can be produced which is thicker than any coat heretofore possible and therefore has better hiding power than the older enamels.

A common defect in enamel spraying, particularly when the usual solvents are used, is known as "dry spray." This usually results when the amount of thinner or solvent is reduced through evaporation before the enamel reaches the surface so that the pigments and resins are deposited in a semi-solid or plastic form. If there is not sufficient thinner left in the coating to cause the particles to flow together into a homogeneous film, a sandy surface results. Enamel to be sprayed must have a relatively low viscosity if the spray gun is to operate satisfactorily; while the viscosity must be relatively high to prevent the deposited enamel from sagging or rippling. This point is important and the volatility of the solvent must be carefully watched. Even slight changes in operating technique—such as the distance the gun is held from the surface—will be reflected in an undesirable or thin coat when the ordinary enamels are used. On one hand, a thick coat is required for hiding purposes, but this can be obtained only through a large amount of pigment. If there is sufficient solvent to carry the pigment, the coat may sag—if insufficient, the spray will be dry. On the other hand, if the gun is too far away, a volatile thinner will disappear before the spray reaches the surface—or if too close, there will be an excess of thinner. Despite these difficulties, there must be enough solvent present on the panel to permit complete coalescence and a thorough baking of the enamel.

It will thus be seen that the requirements of the ideal enamel are contradictory and, heretofore, it was only by compromise that even a workable substance was obtained. I have attacked this problem from the standpoint of viscosity control and have so arranged my composition that a proper and changing viscosity is obtained which is suitable for each point of the process.

This invention has special application and reference to what are known as the alkyd enamels. These enamels contain as the essential elements, a resin, a pigment and thinner. It is the latter with which I am particularly concerned. The function of the thinner is merely to make possible the application of the pigment and resin which form a protective coating, the thinner itself being dissipated and not appearing in the final dry film. The range of thinners which may be used is very wide; and, for one purpose or another, almost every one of them has been used to obtain certain desired effects. Thus, turpentine, naphtha, the various acetates and alcohols have been widely used. Each of these has certain characteristics, such as solubility, boiling point and viscosity, which are taken advantage of in different compounds. These thinners are generally chosen because they are good solvents, either alone or in combination, of the resins used.

As was noted above, the viscosity of the enamel is of the greatest importance. It has been established, moreover, that the viscosity of the enamel which I have under consideration is generally an inverse function of the solvent power of the thinner used. A good solvent will dissolve more resin to give an enamel of a certain viscosity than will a poor solvent to produce an enamel of the same viscosity. Since we have noted above that to obtain fullness of surface and luster a larger proportion of the solids is necessary, the obvious procedure was to use the very good solvents to obtain this larger proportion while maintaining the low viscosity required for spraying. This resulted in a sprayed surface which, upon the application of heat, dried out without becoming fluid, thereby forming orange peel.

In this improved enamel a constituent is added which, while not a thinner, functions in such manner that after the initial application of the baking heat it causes the uneven sprayed surface to flow out flat. The amount of this constituent is so chosen that the initial increase in viscosity of the enamel, due to the evaporation of its solvents, is balanced by the fluidity of this constituent, thereby allowing the uneven surface to level out before the actual drying occurs.

It has always been assumed that a suitable thinner in such an enamel should be composed of solvents of the resin or of each other or both. This invention is predicated upon the novel assumption that the thinner should include some substance that is either a very poor solvent or a nonsolvent of the enamel. A further result of this assumption is that this substance must have a relatively high-boiling point to prevent its dissipation during the spraying process. It should, moreover, be such that as the remainder of the thinner is evaporated out during the drying process, this substance will increase markedly the viscosity of deposited film to maintain it in place and avoid rippling, while at the same time rendering it sufficiently plastic to flow into a smooth and even coat.

With these considerations in mind, I have found that the higher boiling kerosenes whether from paraffine, asphalt or mixed bases, react with enamels of this type to eliminate orange peel in the completed finish. Thus, the expenses incident to hand-rubbing are avoided and it is possible to apply a full coat without danger of either "dry spray" or sagging and without particular attention to the details of application such as the distance the gun is held from the work, etc. An adequate amount of vehicle is present in the deposited film to permit complete coalescence and the polymerization of the resins and hardening of the coat under infrared heating proceeds uniformly outwardly from the metal surface through the enamel giving a dense, homogeneous and durable film.

Though kerosene is normally considered as a solvent for oils, greases, asphalt, paints, etc., I have found that it has a particular reaction with the alkyds, especially as the glycerol phthalate concentration increases. This is apparent in the production of a stiffer gel which becomes most noticeable in enamels having a resin content with above 45% glycerol phthalate; and becomes more pronounced as the phthalate content increases. The colloidal state of the enamel is altered by the addition of the kerosene to form what may be best described as a thixotropic gel. This is evidenced by a livering action—although on stirring the enamel again returns to the colloidal state. It is this gelling or livering produced by the kerosene which appears to make possible the spraying of heavier wet coats without sagging and the leveling out of the applied coat under heat. In its absence, the enamel would set from the liquid state to the dry film without the intermediate transformation of the pebbled and partially coalesced sprayed coat to the smooth dry film.

The following shows the characteristics of several solvents which may be used, as compared with a kerosene. In this connection, the word kerosene as used in this specification is to be taken as an indication of a hydrocarbon fraction whose lower boiling point is substantially 200° C. and substantially 50% of which boils through the range from 230°–270° C.

| Solvent | Distillation Range, Degrees C. | Per Cent Resin Dissolved [1] |
|---|---|---|
| Kerosene | [2] 200–290 | 22.5 |
| Naphtha Spirits | 160–190 | 33 |
| Heavy Petroleum Naphtha | 185–200 | 45 |
| Petroleum Hi-flash Naphtha | 155–221 | 48.5 |
| Xylol | 130–138 | 52.5 |
| Ethyl Acetate | 70–80 | 67 |

[1] Viscosity at 200 seconds in a No. 3 Ford cup.
[2] 50% above 230°.

To carry out this invention, I add to an alkyd enamel kerosene—as defined above—varying in amount from 2–10%. This addition may be made at the time of manufacturing the enamel or just before spraying. Enamels are usually compounded with much higher viscosities than are suitable for spraying and the kerosene is then added to aid in reducing the enamel to a suitable spraying viscosity. However, it is noted from the above table that as kerosene alone remains, the viscosity builds up sharply from the point at which other solvents have evaporated off and the result is that the film so applied is much less likely to ripple or sag.

Typical examples of compounded resins which may be used with kerosene are:

*Resin solutions*

| | A | B | C | D |
|---|---|---|---|---|
| | Per cent | Per cent | Per cent | Per cent |
| Solids | 55 | 45 | 47 | 59 |
| Volatile | 45 | 55 | 53 | 41 |

*The solids content comprising—*

| | A | B | C | D |
|---|---|---|---|---|
| | Per cent | Per cent | Per cent | Per cent |
| China-Wood Oil | | | 13 | 32 |
| Tung Oil | | 3 | | |
| Soybean Oil | | | 33 | |
| Castor Oil (Dehydrated) | | 10 | | |
| Linseed Oil | 50 | 33 | | |
| Phthalic Anhydride | 35 | 38 | 38 | |
| Glycerine | 15 | 16 | 16 | |
| Phenolic Resin | | | | 68 |

*The volatile content comprising—*

|  | A | B | C | D |
|---|---|---|---|---|
|  | Per cent | Per cent | Per cent | Per cent |
| Naphtha Spirits | 70 | 100 | 100 |  |
| Petroleum Hi-flash Naphtha | 30 |  |  |  |
| Xylol |  |  |  | 100 |

These may be mixed to form the following typical enamels:

*Enamels*

|  | I | II | III | IV |
|---|---|---|---|---|
|  | Per cent | Per cent | Per cent | Per cent |
| Solids | 43 | 50 | 62 | 46 |
| Volatile | 57 | 50 | 38 | 54 |

*Division of solids content*

|  | I | II | III | IV |
|---|---|---|---|---|
|  | Per cent | Per cent | Per cent | Per cent |
| Pigment | 10 | 48 | 49 | 16 |
| Resins | 90 | 52 | 51 | 84 |

*The resins content comprising—*

|  | I | II | III | IV |
|---|---|---|---|---|
|  | Per cent | Per cent | Per cent | Per cent |
| A | 28 | 100 | 23 | 20 |
| B |  |  | 75 | 80 |
| C | 66 |  |  |  |
| D | 6 |  | 2 |  |

*And an added volatile content comprising—*

|  | I | II | III | IV |
|---|---|---|---|---|
|  | Per cent | Per cent | Per cent | Per cent |
| Naphtha Spirits | 58 |  | 100 | 60 |
| Petroleum Hi-flash Naphtha | 35 | 100 |  | 40 |
| Xylol | 4 |  |  |  |
| Ethyl Acetate | 3 |  |  |  |

As compounded, these enamels comprise:

I

|  | Percent |
|---|---|
| Resins (including 3% phenolic) | 39 |
| Pigment (black) | 4 |
| Naphtha spirit | 41 |
| Petroleum Hi-flash naphtha | 12 |
| Xylol | 3 |
| Ethyl acetate | 1 |

II

|  |  |
|---|---|
| Resins | 26 |
| Pigment | 24 |
| Naphtha spirit | 30 |
| Petroleum Hi-flash naphtha | 20 |

III

|  |  |
|---|---|
| Resins | 32 |
| Pigment | 30 |
| Naphtha spirit | 35 |
| Petroleum Hi-flash naphtha | 2 |
| Xylol | 1 |

IV

|  |  |
|---|---|
| Resins | 39 |
| Pigment | 7 |
| Naphtha spirit | 41 |
| Petroleum Hi-flash naphtha | 13 |

Immediately before application, from 2-10% of kerosene as defined above is added and if any further reduction in viscosity is required, it can be effected by additional amounts of any of the solvents listed above, as used in the manufacture of the enamel. In general, however, the kerosene is all that is required. The kerosene could, of course, be added during the compounding step, were it not that the exact amount required may vary with the atmospheric conditions prevailing in the spray booth. The better practice is to add it just before spraying and to then determine the amount required by inspection of the deposited film. An excess of kerosene within the above range is not detrimental, but merely affects the drying time. However, an excess outside of the range is reflected in softness in the dried film.

Examples I to IV are illustrative of the wide field to which this invention may be applied. The particular enamels vary in color, pigments, resins, solvents, percentile distributions, etc. While the emphasis is on alkyd resins, small amounts of phenolics or even melamines can be used with appropriate solvents. These are used in specific cases such as to prevent cracking or crinkling which is sometimes encountered. All, however, are characterized by the addition of 2-10% of the high-boiling fraction kerosene and in each case the enhanced surface appearance which has been described.

The distinctive feature in each is the large glycerol phthalate proportion in the resin and the fact that the viscosity of the enamel is not substantially affected by the added kerosene. Nevertheless, the coat as sprayed is both thick and wet and readily smoothes out under heat. The greater proportion of the solvent in each case is a hydrocarbon; i. e., such as naphtha spirits, boiling below 200° C. and preferably in the range from 160-190° C. The essential added element is the high-boiling kerosene substantially 50% of which boils above 230° C. and whose upper-boiling range is about 290° C. The resin content varies from about 30 to 40%, depending upon the relative amount of pigment required for each color desired.

The final step in the treatment of these finishes is to bake them. For this step, I may use either infrared heating, as disclosed in Patents Nos. 1,998,650 and 2,186,067, or a conventional oven. With either process the temperature does not at any time exceed 125° C. It appears that by drying the enamel during the baking step at a temperature well below the distillation range of the kerosene, the plasticity of the coat is maintained sufficiently long to permit the proper surface flow, while the kerosene itself gives suitable viscosity to the coat to prevent ripple or sag.

Briefly, this invention may be said to consist of incorporating in an alkyd enamel as a diluent a kerosene which has an extremely high boiling-point range and which is a poor solvent of the other elements forming the enamel. I thus obtain two particular advantages: One of these advantages is that by reason of the high-boiling point, sufficient of this diluent remains in the sprayed enamel to permit plasticity of the surface. The other advantage is that the diluent has characteristics imparting a very high viscosity, so that while the surface is sufficiently plastic to obtain this secondary flow, at the same time it is viscous enough to prevent sags or ripples.

Some variations in the boiling range and amount of diluent used may be made without departing from the spirit of my invention and it is my intention to cover by my claims such variations as may reasonably be included within the scope thereof.

I claim as my invention:

1. A baking enamel comprising, an alkyd resin and a volatile hydrocarbon thinner having a boiling point of less than 200° C., and from 2-10% kerosene based on the combined weight of the other components of the enamel which, upon the initial application of the baking heat, causes the enamel to flow forming a smooth surface and which, upon the remaining application of said baking heat, dries and leaves said resin otherwise unaffected thereby, said kerosene having a boiling range above the boiling range of said thinners.

2. An enamel composition characterized by the formation of a smooth surface on drying, comprising, substantially from 30-40% alkyd resins having a glycerol phthalate content in excess of 45%, a pigment, and the balance volatile solvents substantially all of which comprises hydrocarbons having a boiling range from 150 to 200° C. to which is added from 2-10% kerosene based on the combined weight of the other components of the enamel, said kerosene having a boiling range above the boiling range of said solvents.

3. A baking enamel characterized by the formation of a smooth surface on drying, comprising, a pigment, substantially 30-40% of alkyd resins having a glycerol phthalate content in excess of 45% dissolved in volatile solvents, said volatile solvents comprising substantially all naphtha hydrocarbons having a boiling range of from 150 to 200° C., and from 2-10% of a high-boiling kerosene substantially 50% of which boils at temperatures in excess of 230° C., said percentage of kerosene based on the combined weight of the other components of the enamel.

4. A baking enamel characterized by the formation of smooth surfaces on drying, comprising, a pigment and alkyd resins and a solvent, the greater part of which is chosen from the class of petroleum hydrocarbons having a boiling range of from substantially 150-200° C., and from 2-10% of a high-boiling range kerosene substantially 50% of which boils above 230° C., said percentage of kerosene based on the combined weight of the other components of the enamel.

5. A baking enamel characterized by the formation of smooth surfaces on drying, comprising, a pigment and alkyd resins having glycerol phthalate content of at least 45% and a solvent, the greater portion of which is chosen from the class of petroleum hydrocarbons having a boiling range of from substantially 150-200° C., and a gelling agent consisting of from 2-10% of a high-cut kerosene substantially 50% of which boils through the range of from 230-290° C., said percentage of kerosene based on the combined weight of the other components of the enamel.

6. A baking enamel characterized by the formation of smooth surfaces on drying, comprising, a pigment and from 30-40% of alkyd resins having a glycerol phthalate content of about 50% and the balance substantially all hydrocarbon solvents, the greater portion of which boils through the range of 150-200° C., and from 2-10% of a high-cut kerosene substantially half of which boils through the range of from 230-290° C., said percentage of kerosene based on the combined weight of the other components of the enamel.

7. An enamel comprising solids, volatile hydrocarbon thinners and kerosene, said solids comprising pigments and alkyd resins, said thinner having a boiling point range of less than 200° C., and said kerosene having a boiling point range above the range of the volatile thinner and being present to the extent of 2 to 10% based on the combined weight of the other components of the enamel.

CHARLES J. BARTHOLOMEW.

REFERENCES CITED

The following references are of record in the file of this patent:

UNITED STATES PATENTS

| Number | Name | Date |
|---|---|---|
| 1,942,757 | Illif | Jan. 9, 1934 |